INVENTOR.
LAWRENCE L. BEWLEY
KENNETH H. WHITE
ARNOLD J. JORGENSEN
BY
Christie, Parker & Hale
ATTORNEYS INVENTOR.
LAWRENCE L. BEWLEY
KENNETH H. WHITE
BY ARNOLD J. JORGENSEN
Christie, Parker & Hale
ATTORNEYS July 7, 1970 L. L. BEWLEY ET AL 3,519,959
INTEGRAL ELECTRICAL POWER DISTRIBUTION NETWORK AND
COMPONENT MOUNTING PLANE
Filed March 24, 1966 4 Sheets-Sheet 3

INVENTOR.
LAWRENCE L. BEWLEY
KENNETH H. WHITE
ARNOLD J. JORGENSEN
BY
Christie, Parker & Hale
ATTORNEYS July 7, 1970 L. L. BEWLEY ET AL 3,519,959

INTEGRAL ELECTRICAL POWER DISTRIBUTION NETWORK AND COMPONENT MOUNTING PLANE

Filed March 24, 1966 4 Sheets-Sheet 4

INVENTOR.
LAWRENCE L. BEWLEY
KENNTH H. WHITE
ARNOLD J. JORGENSEN

BY Christie, Parker & Hale
ATTORNEYS

United States Patent Office 3,519,959

Patented July 7, 1970

3,519,959

INTEGRAL ELECTRICAL POWER DISTRIBUTION NETWORK AND COMPONENT MOUNTING PLANE

Lawrence L. Bewley, Claremont, Kenneth H. White, West Covina, and Arnold J. Jorgensen, Duarte, Calif., assignors to Burroughs Corporation, Detroit, Mich., a corporation of Michigan Filed Mar. 24, 1966, Ser. No. 537,049

Int. Cl. H05k *1/04, 1/14, 3/30*

U.S. Cl. 333—6 2 Claims

ABSTRACT OF THE DISCLOSURE

A plurality of conductive sheets are stacked in spaced relationship. A plurality of dielectric sheets are stacked in the space between the conductive sheets. The thickness of the dielectric sheets varies so that pairs of the conductive sheets have different characteristics impedances. Sources of electrical signals with different frequency characteristics are each connected to a pair of conductive sheets having the appropriate characteristic impedance. Dielectric sheets having slightly larger areas than the conductive sheets are disposed on both ends of the stack of conductive sheets such that the edges of the conductive sheets are set in from the edges of the dielectric sheets. The portions of the conductive sheets to which contact is to be made are pressed against a stiff mounting plane to form conductive rings that can be pierced by terminal pins.

This invention relates in general to an electrical signal distribution network and a method for forming this new and novel network. More particularly this invention relates to a network having a plurality of controlled characteristic impedances utilizing alternate conductive and nonconductive layers laminated to a rigid mounting plane so as to supply selected electrical signals to electronic circuits mounted thereon.

Today's electronic computer systems utilize a great number of electronic circuit components such as amplifiers, detectors, memory devices, etc. For the computer operation such electronic circuit components require ground potential, direct current potentials and alternating current potential such as clock sigals. In the computer operation, high frequency noise and cross talk is a constant problem in that the electronic compoennts develop noise levels which often exceed the total noise level allowable for the overall computer system. One of the most significant factors which creates high noise levels is the manner of supplying electrical power to the operating components of the computer.

In order to avoid high noise levels in prior art computers, it has been general practice to rovide a ground potential which is common for all of the various components mounted in the system and to further provide a power transmission line having various direct and alternating curret potential which serve as a power supply for the electroic components. Such electronic components are often mounted on a component holder and have exposed electric terminal pins which are available for soldering or wire wrapping. Connecting leads from the exposed terminals connect the electronic components to ground and the various potentials of the power transmission line.

This technique of the prior art is objectionable in that the very presence of connecting leads increases complexity, is uneconomical, makes circuit tracing difficult, and contributes significantly to high noise levels. Furthermore, the numerous soldering or wire wrapping connections and connecting leads develop a high dynamic impedance which, of course, is undesirable for economical power distribution. In attempts, mostly unsuccessful, to reduce this high dynamic impedance, large by-pass, capacitors have been connected at selected locations between the power transmission lines and ground. This approach requires a large number of bulky high-cost capacitors and is objectionable.

Other prior art approaches for supplying power to computer components include printed circuit configurations which are placed on the surface of non-conductive mounting boards. Numerous independent and complex configurations are required to supply the signals necessary for the computer components. These configurations, which are often located near each other, add to the system's cross talk, or noise, caused by the distributed capacitance established between adjacent circuit configurations. Complex and costly shielding techniques have been employed in what is recognized as a generally unacceptable effort to cancel out such distributed capacitance.

The foregoing disadvantages of the prior art are avoided in accordance with the principles of this invention wherein a compact, rugged component mounting and power distributing system is formed as a controlled low characteristic impedance unit. The distribution network of this invention takes the form of a stiff backplane, or component mounting plane which has laminated thereon additional sheets of dielectric material interleaved with sheets of conductive material. The mounting plane includes appropriately patterned holes as a means for mounting electronic components; and the conductive sheets include portions exposed at holes formed therein which are aligned with the holes of the mounting plane for establishing electrical connection to the electronic components mounted thereon.

Various electrical signals are selectively available at selected ones of the conductive sheets. For example, an active conductive sheet having a direct current voltage applied thereto is sandwiched between a pair of thin dielectric sheets having a high dielectric constant. These sheets are sandwiched between two additional conductive sheets that are maintained at ground potential. The resulting active voltage sheet is characterized by a low impedance and high capacity to ground. Noise spikes resulting from switching or other electrical disturbances in components drawing power from this ctive plane are grounded by the high capacity and an improved noise level and component performance results from this invention.

Also available within the distribution network is a high frequency alternating current sheet for providing clock signals. The dielectric sheet sandwiching this clock sheet are considerably thicker to obtain a specific desired charateristic impedance for this clock sheet.

The openings in the mounting plane include a first plurality of holes having a first diameter chosen to receive a plurality of downwardly extending electrical connecting pins for a component to be mounted and electrically connected to the network. Disposed on the mounting plane is a plurality of laminated dielectric sheets having a second equally-numbered plurality of openings alignably matched with the first plurality of openings in the mounting plane, each opening of said second plurality having a second diameter larger than the first diameter of the mounting plane openings. Electrically conductive sheets, each of which may represent different electrical signal values, are interleaved between the dielectric sheets. At locations where an electrical connection is desired, the conductive sheets at that location extend lateral ly from the edges of the larger diameter holes in the dielectric sheets. These laterally extending portions of the conductive sheets are disposed in contiguous relationship to the mounting plane to form an annular conductive ring of at least one conductive sheet around the opening in the mounting plane for electrical contact with a terminal pin. The pressure for deforming or otherwise disposing the conductive sheets against the mounting plane is supplied by pressure applied either during or after the lamination operation for the network. Once the electrical sheets are in contact with the stiff mounting plane, they may be drilled or otherwise pierced with a plurality of openings for securely and electrically mating the connection pins thereto.

At any location destined not to receive power, the conductive sheets at those locations prior to the lamination bonding operation, are initially drilled or otherwise punched with holes having a diameter larger than the diameter of openings in the dielectric sheets. All sheets are properly aligned. Then pressure and heat are applied during a lamination bonding operation. This lamination forms a wall of dielectric material between the edges of the conductive sheets thus insulating the electrical sheets from the pins or other electrical terminals mounted on the distribution network.

The foregoing features and advantages of this invention may more readily be appreciated by reference to the accompanying drawings in which:

FIG. 7 is a plan view of an alternative embodiment of this invention; and

Figures 1, 2:
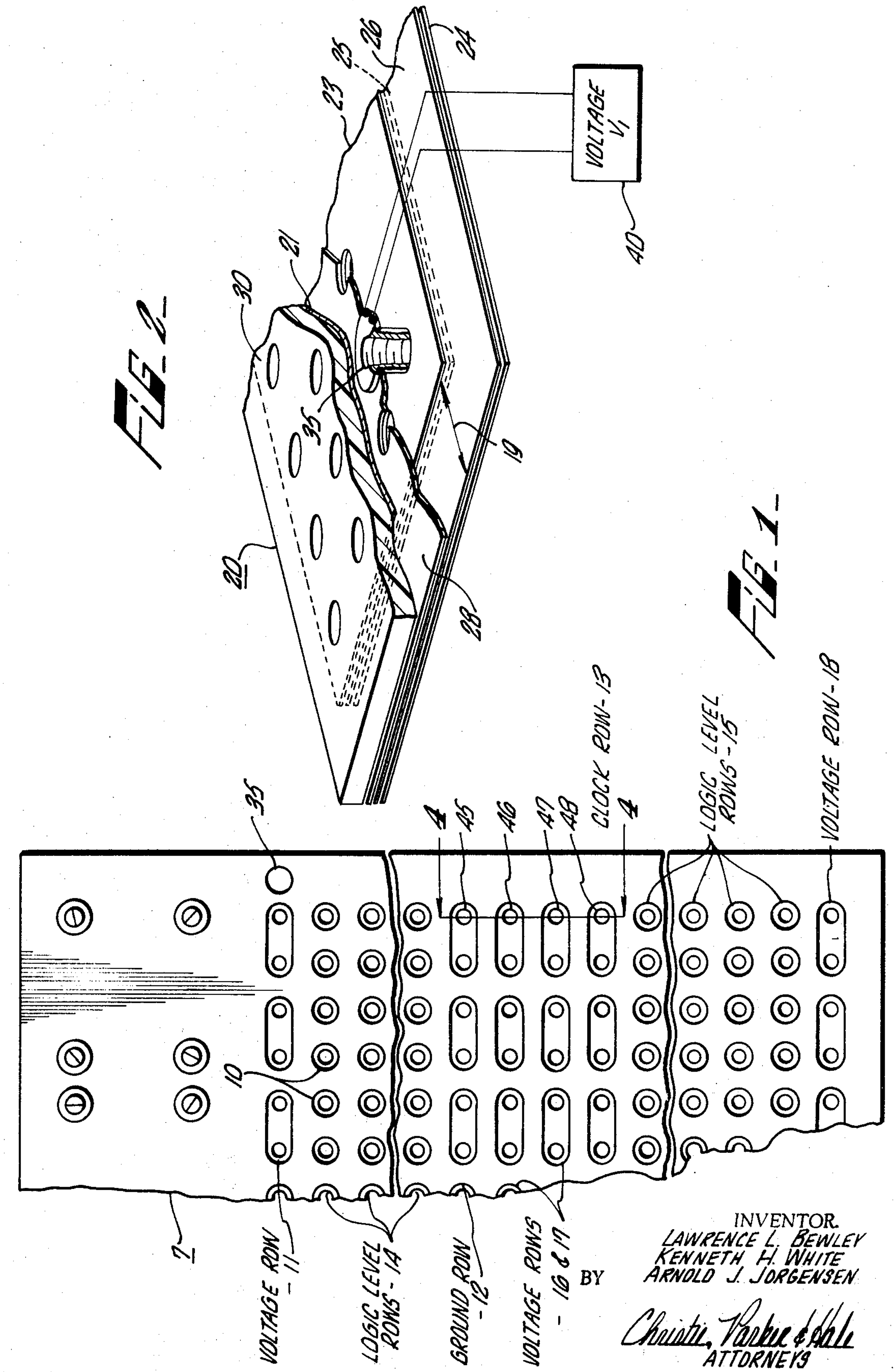
FIG. 1 is a plan view of one portion of a laminated electrical distribution and component mounting network in accordance with this invention.
FIG. 2 is a cutaway section of one portion of the network of FIG. 1.

Turning now to FIG. 1, a top plan view disclosing a plurality of openings in the uppermost surface of a laminated electrical distribution network 7 of this invention is shown. This network includes horizontal rows and vertical columns as defined by a plurality of openings 10. Each vertical column is spaced from an adjacent column to allow component cards with exposed electrical pins to be individually mounted one each at each column of network 7. It should be understood, of course, that this invention is not limited to mounting components having only a single row of electrical pins in that any pattern of pins or other electrical terminals may be accommodated by providing a corresponding pattern of openings.

The top horizontal row of openings 10 may advantageously be a voltage row 11 wherein any terminal pin of a component to be mounted on the distribution network of FIG. 1 will make electrical contact with at least one conductive layer, which layer has either a voltage or ground applied to it. For example, the voltage of the top horizontal row 11 may be any desired voltage from several different voltage values capable of being supplied by the electrical distribution network 7 of this invention. These several different voltage values are selected in accordance with the different supply voltages required for particular circuit components to be mounted on the electrical distribution network 7. Other voltage rows such as rows 16, 17 and 18 each represent different voltage values as may also be necessary in order to supply power to components mounted on the network 7.

Also provided is a clock row 13, and a plurality of logic level rows 14 and 15. Clock row 13 may be utilized to provide a plurality of pulses necessary for timing selective operations for computer components mounted on the electrical distribution network 7. Logic level rows 14 and 15 are chosen so as to not make electrical connection with any of the conductive layers of the distribution network 7 of FIG. 1. These rows 14 and 15 serve merely to house terminal pins of components mounted on the network of FIG. 1 in such a manner that conventional wire wrapping or soldering connections may be made to these logic-level terminal pins.

A portion 20 of the distribution network 7 of FIG. 1 is shown in a cutaway sectional view of FIG. 2. This portion 20 of the network of FIG. 1 discloses some of the various laminated layers of conductive and dielectric materials. For example, a conductive sheet 23 is sandwiched between dielectric sheets 26 and 28. The conductive sheets, such as 23, may be any suitable conductive material such as copper, silver, or gold. The dielectric sheets may be any suitable dielectric such as epoxy glass. A stiff mounting plane 30, having disposed on it the laminated layers of dielectric sheets and conductive sheets, may also be a dielectric material the same as that of the dielectric sheets.

Each of the conductive sheets is inset from the edge of the distribution network by a small amount 19 as shown. This inset 19 exists on all exterior edges of the conductive sheets in the distribution network 7, and serves to provide adequate insulation between all of the conductive sheets and any metal cases in which the distribution network may be housed. As shown in the view of FIG. 2, the conductive sheet 23 is provided with a terminal connector 35 so that sheet 23 may be connected, in any suitable manner, to an appropriate voltage source 40.

Figure 3:
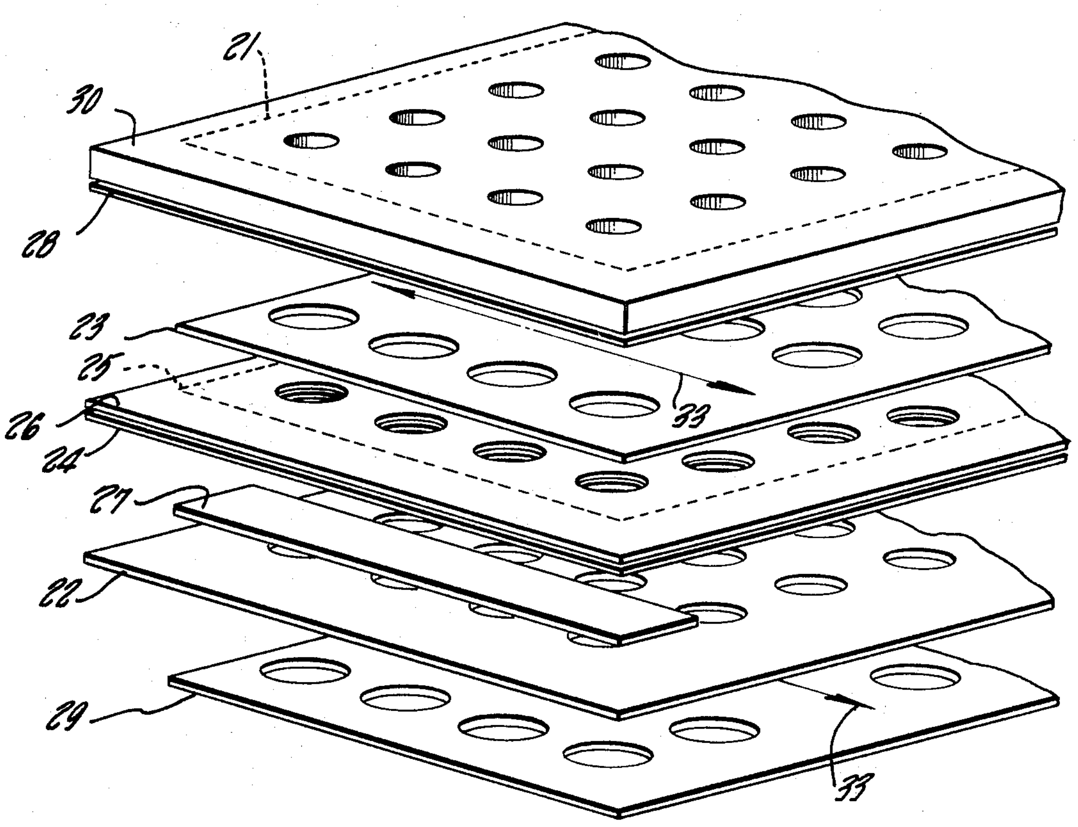
FIG. 3 is an exploded view of some of the laminations of the cutaway section of FIG. 2.
Figure 1:
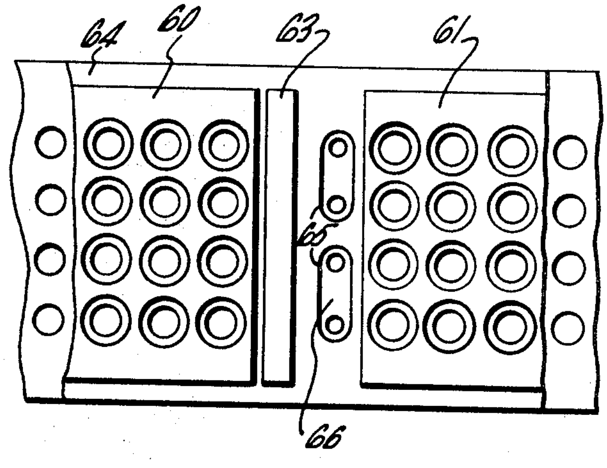

FIG. 2 is repeated in a partly-exploded view in FIG. 3, wherein the mounting plane 30, dielectric sheets 22, 24, 26 and 28 and conductive sheets 21, 23, 25, 27, and 29 are disclosed in more detail. It is to be noted that all the sheets that comprise the network are not depicted in FIG. 3. As shown in FIG. 3, a conductive sheet 27 need not extend over the entire surface of the distribution network if the distributed capacity for that conductive layer is desired to be a specific value normally lower in value than the distributed capacity for the other layers. As a typical example, it may be desirable to provide a source of alternating current signals such as clock pulses for components that are to be mounted on the distribution network. A clock source requires a precise and controlled characteristic terminating impedance, whereas the direct current voltage sources benefit by the lowest possible characteristic impedance.

It is known that a characteristic impedance for a power transmission network is equal to the square root of the term, network inductance divided by network capacitance. The dielectric sheets for the distribution network of this invention can be selected from materials having known dielectric constants. By varying the thickness of the dielectric sheets having a desired dielectric constant, the inductance for the network is controllably decreased and the capacitance for the network is controllably increased. A plurality of low and controlled characteristic impedances are thus possible for the power distribution network of this invention.

The relationships between the thickness dimensions and dielectric constants of dielectric material as they affect the capacitance and inductance values are well known and need not be discussed in detail. Suffice it to say that for a direct current voltage source 40 connected to conductive sheet 23, FIG. 2, a low valued characteristic impedance is obtained by employing thin dielectric sheets 26 and 28, and a pair of grounded sheets 21 and 25. The voltage of source 40 is distributed over the current carrying sheet 23, which may be a two ounce copper sheet approximately .0025 inch thick to give a typical example. Epoxy glass sheets 26 and 28 may have a dielectric constant of 4 and are also approximately .0025 inch thick. Copper sheets 21 and 25 are grounded and thus dielectric sheets 26 and 28 represent capacitors to the ground potential of sheets 21 and 25. This high capacity is shown symbolically by dashed capacitors 41 and 42, FIG. 4. Such high capacity represents substantially short circuits to ground for noise spikes or transients reflected in the power drain by mounted components from the active power-supplying sheet 23. The direct current potential from sheet 23 is supplied at opening 47, FIG. 4.

Figure 4:
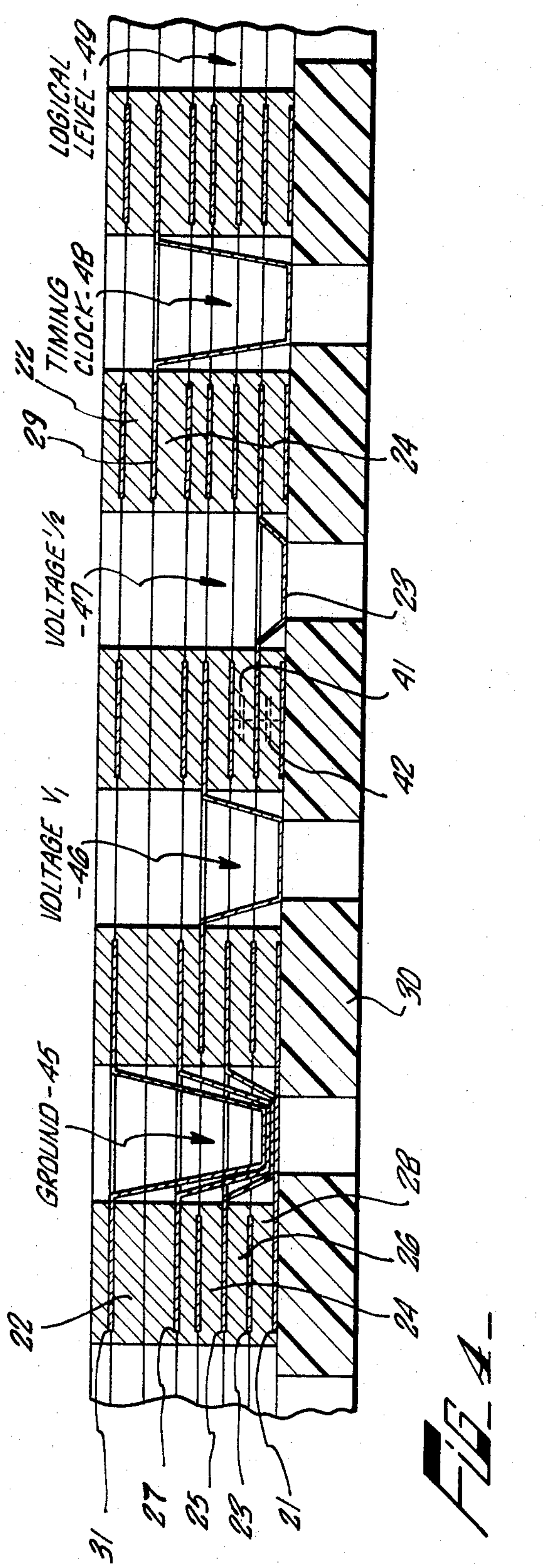
FIG. 4 is a side elevation of the network of FIG. 1 (turned over with respect to FIGS. 2 and 3) showing the alternate conductive and dielectric sheets.

The side elevation of FIG. 4 also depicts dielectric sheets 22 and 24 which are thicker than the remaining dielectric sheets. FIG. 4 shows the network in a view that is turned over with respect to the views shown in FIGS. 2 and 3. At clock opening 48, the narrow copper sheet 29 is shown sandwiched between dielectric sheets 22 and 24, which sheets in turn are sandwiched between two grounded sheets 27 and 31. The capacity values from strip 29 to the ground potential of sheets 27 and 31 is thus of lower value than the high capacity shown as dashed capacitors 41 and 42 for power-supplying sheet 23. Clock sheet 29 supplies high frequency alternating current signals and requires a precise terminating impedance. This precise terminating impedance is obtained by selectively choosing the thickness of dielectric sheets 22 and 24 so that the proper inductance and capacitance is provided for the desired value of terminating impedance. For example, a characteristic impedance value in the range of 90 ohms, to give an example, requires a thickness of .030 inch for each dielectric sheet, assuming a dielectric constant of 4. At high frequencies the skin-effect current carrying capacity of clock sheet 29 is far more important than the volume of the copper and thus the width and thickness of sheet 29 are not critical.

The method of assembly for the network of this invention will now be discussed. Both the conductive sheets and the dielectric sheets are prepunched prior to lamination. In conductive sheets 25 and 29, FIG. 3, prepunched rows of holes designate locations which will not make electrical contact with mounted components once the sheets are bonded in laminated form. On the other hand, where a row of prepunched holes is missing such as are designated in area 33 on sheets 25 and 29, contact with the mounting plane 30 will be made at these locations once the entire network is laminated and subjected to a final drilling or piercing step. A bonding agent such as epoxy resin is applied to the surface of the dielectric sheets; and the entire assembly, once proper alignment is achieved, is bonded together under pressure and heat into an integral unit. Pressure applied either during or after bonding depresses the areas outlined at 33 of the thin copper sheets 25 and 29 until these areas of copper sheets 25 and 29 are pressed against the stiff mounting plane 30, as illustrated in FIG. 4. Thereafter the assembly is subject to the final drilling operation and the depressed areas, in which there are no prepunched holes, become properly-sized openings for receiving terminal pins of components to be mounted on the distribution network. The annular conductive rings formed by the depressed areas may include several sheets of conductive material such as sheets 25, 29, and 31 in FIG. 4 or may be single sheet of conductive material such as sheet 27 in FIG. 4. Prior to lamination, the entire surface of both sides of the conductive sheets may be plated with a tin and lead mixture. As an alternative, only those areas to receive terminal pins may be coated with a tin and lead mixture. This mixture alloys during subsequent soldering operations, to be described, and thus enhances electrical connections between the annular conductive ring and electrical terminal pins.

The manner in which the conductive sheets are depressed and joined as annular conductive rings on the stiff mounting plane 30 is more clearly shown in FIG. 4 which is a side elevation taken along lines 4—4 of FIG. 1. The side elevation of FIG. 4 from left to right shows connection openings including ground opening 45, a first direct current voltage level opening 46, a second direct current voltage level opening 47, a timing clock, or alternating-current level opening 48, and a logic level opening 49.

Figure 5:
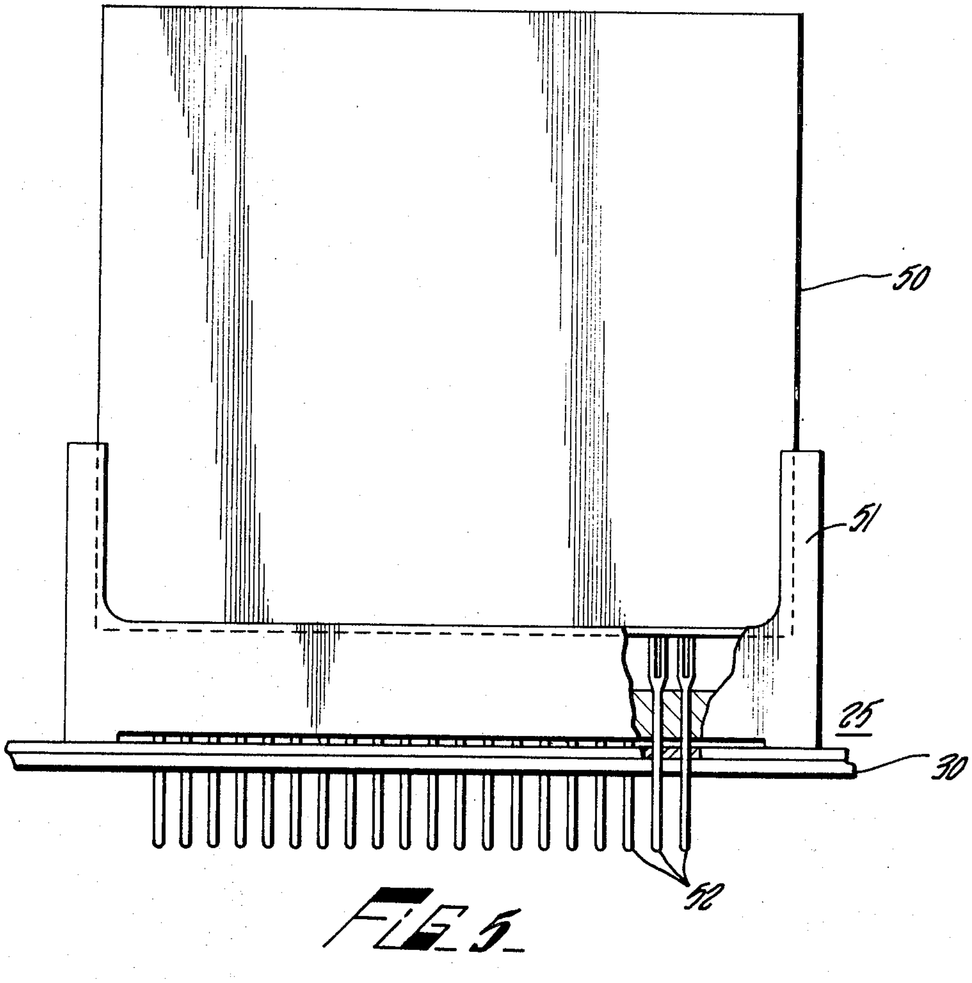
FIG. 5 depicts a component board and holder mounted on the backplane side of an electrical distribution network of this invention.
Figure 6:
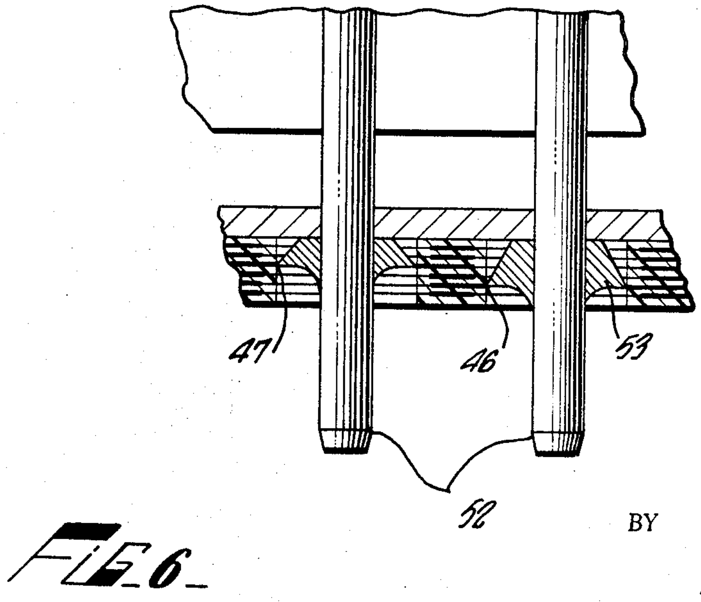
FIG. 6 shows one way of forming an electrical connection between a terminal pin of a mounted component and a conductive layer of the network of this invention.

FIG. 5 depicts a component board 50, mounted on the stiff mounting plane 30 and having terminal pins 52 extending through the mounting plane and the laminated conductive and dielectric layers. Pins 52 may be received in holes which are drilled, punched, or simply pierced in the thin conductive sheets by the pins themselves. In either event, solder 53, FIG. 6, is applied to fill the cone-shaped area defined by the depressed electrical conductive sheet in openings 46 and 47. Voltages supplied to these conductive sheets are thus electrically supplied to pins 52 through positive electrical connection assured by the tin-lead plating at these locations alloying with the solder 53 during the soldering operation.

An alternative embodiment which requires less conductive sheets is depicted in plan view of FIG. 7 wherein two separate sheets 60 and 61 for two different direct current voltage levels are shown in a common plane separated by a narrow clock track 63. A pair of dielectric sheets, of which only sheet 64 is shown, are again laminated on opposite sides of conductive sheets 61, 62 and 63. Two additional conductive sheets for ground levels are also laminated in a manner similar to that described hereinbefore. One of these ground level conductive sheets 66 is depicted below opening 65 which serves as a ground connection location.

Figure 8:
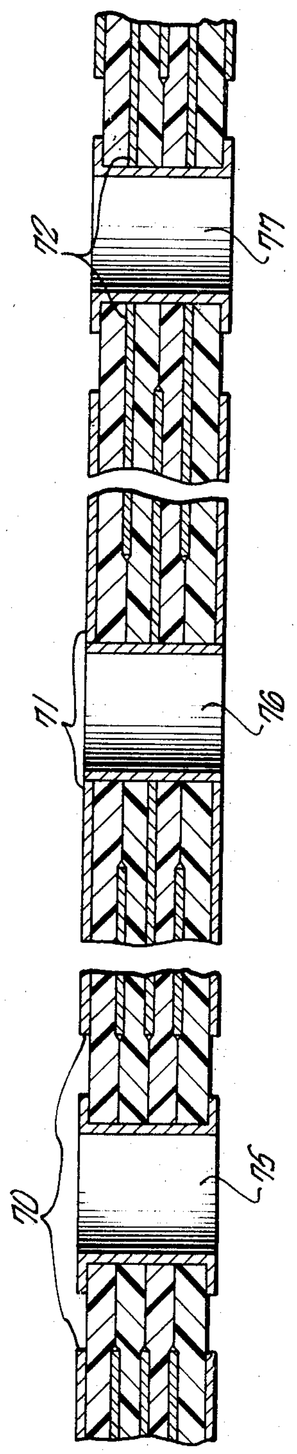
FIG. 8 is a side elevation of plated-through connections as an additional embodiment of this invention.

In FIG. 8 an alternative embodiment is disclosed wherein plated-through connections are employed. Oversized holes 70 in conductive sheets at locations where no electrical power is to be supplied are again provided. A smaller diameter opening 71 or 72 in the conductive sheets, which smaller openings may advantageously be the diameter of the openings in dielectric sheet, are provided at locations where an electrical connection is to be made. Any well known plating-through technique may supply the conductive material at locations such as 75, 76 and 77.

It is to be understood that the foregoing features and principles of this invention are merely descriptive, and that many departures and variations thereof are possible by those skilled in the art, without departing from the spirit and scope of this invention.

A continuation-in-part application, Ser. No. 885,117, filed on Dec. 15, 1969, and assigned to the assignee of the present application, claims part of the subject matter disclosed in the present application.

What is claimed is:

1. An electrical signal distribution network for supplying a plurality of electrical signals with different frequency characteristics to component boards comprising:

a stack of conductive sheets having at least one ground sheet positioned between at least two electrical signal supply sheets, dielectric material occupying completely the space between adjacent conductive sheets, the combination of area of the conductive sheets, the thickness of the dielectric material between adjacent conductive sheets and dielectric properties of such dielectric material being different between a first adjacent pair of ground and signal supply sheets than between a second adjacent pair, thereby providing a different impedance characteristic between the first pair than between the second pair;

at least two sources of electrical signals with different frequency characteristics, one of said sources being connected between one of said pairs of adjacent conductive sheets and the other source being connected between the other of said pairs;

a connector for receiving component boards, the connector having a plurality of terminals;

a rigid insulated base plane in abutment with one end of the stack of conductive sheets;

a plurality of holes through the stack of conductive and dielectric sheets, the holes being in registration with the terminals of the connectors;

the holes in the conductive sheets from which no connection is to be made to the corresponding terminal being larger in diameter than the holes in the dielectric sheets, and the portions of the conductive sheets from which connection is to be made to the corresponding terminal being depressed against the rigid base plane to form annular conductive rings; and pins piercing the conductive rings, the pins being connected to the terminals so as to supply the electrical signal thereto, the pins connecting a first pair of said terminals to one of said pairs of adjacent conductive sheets and a second pair of terminals to the other of said pairs of conductive sheets for receiving the corresponding electrical signals.

2. An electrical signal distribution network for supplying electrical signals to component boards comprising:

a plurality of conductive sheets stacked in spaced relationship;

a plurality of dielectric sheets stacked in the spaces between the conductive sheets;

a source of electrical signals connected to a pair of the conductive sheets;

a plurality of connectors for receiving component boards, each connector having a plurality of terminals;

a rigid insulated base plane in abutment with one end of the stack of conductive sheets;

a plurality of holes through the stack of conductive and dielectric sheets, the holes being in registration with the terminals of the connectors, the holes through the conductive sheets from which no connection is to be made to the corresponding terminal being larger in diameter than the holes through the dielectric sheets, and the portions of the conductive sheets from which connection is to be made to the corresponding terminal being depressed against the rigid base plane to form annular conductive rings; and pins piercing the conductive rings, the pins being connected to the terminals to establish connection between the conductive ring and the terminals.

References Cited

UNITED STATES PATENTS

| | | | |
|---|---|---|---|
| 1,960,058 | 5/1934 | Lynn | 339—17 XR |
| 2,586,854 | 2/1952 | Myers. | |
| 3,072,874 | 1/1963 | Roney | 339—17 |
| 3,179,913 | 4/1965 | Mittler et al. | 174—68.5 XR |
| 3,184,830 | 5/1965 | Lane et al. | 339—17 XR |
| 3,243,498 | 3/1966 | Allen et al. | 174—68.5 |
| 3,268,653 | 8/1966 | McNutt | 339—17 XR |
| 2,502,291 | 3/1950 | Taylor | 317—101 XR |
| 3,155,881 | 11/1964 | St. Jean | 317—101 |
| 3,218,584 | 11/1965 | Ayer | 333—84 |
| 3,321,717 | 5/1967 | Harper | 333—7 |
| 3,337,820 | 8/1967 | Harper | 307—243 XR |
| 3,346,950 | 10/1967 | Schick | 339—18 XR |
| 3,351,702 | 11/1967 | Stephens | 317—101 XR |
| 3,351,816 | 11/1967 | Sear et al. | 333—84 XR |
| 3,351,953 | 11/1967 | Sear | 174—68.5 |
| 3,372,309 | 3/1968 | Stockdale | 174—68.5 XR |

OTHER REFERENCES

"Semiconductor Networks for Microelectronics," Lathrop, Lee and Phipps, Electronics, May 13, 1960, McGraw-Hill, pp. 69–78.

HERMAN KARL SAALBACH, Primary Examiner

M. NUSSBAUM, Assistant Examiner

U.S. Cl. X.R.

29—626; 174—68.5; 317—101; 333—84